United States Patent
Ortmanns et al.

(10) Patent No.: US 8,150,675 B1
(45) Date of Patent: Apr. 3, 2012

(54) NETWORK SIMULATION FOR DOWNLOAD PROGRESS AND LATENCY

(75) Inventors: Kai Ortmanns, Stelle (DE); Soeren Ammedick, Neumuenster (DE)

(73) Assignee: Adobe Systems Incorporated, San Jose, CA (US)

( * ) Notice: Subject to any disclaimer, the term of this patent is extended or adjusted under 35 U.S.C. 154(b) by 909 days.

(21) Appl. No.: 12/129,853

(22) Filed: May 30, 2008

(51) Int. Cl.
*G06F 9/455* (2006.01)

(52) U.S. Cl. ............................................ 703/23; 703/24

(58) Field of Classification Search ............. 703/23, 703/19, 21, 22, 24; 370/328, 241, 250, 428; 709/246; 455/423, 424, 425
See application file for complete search history.

(56) References Cited

U.S. PATENT DOCUMENTS

| | | | | |
|---|---|---|---|---|
| 5,761,486 | A * | 6/1998 | Watanabe et al. | 703/21 |
| 5,812,530 | A * | 9/1998 | Fernandez et al. | 370/250 |
| 7,339,891 | B2 * | 3/2008 | Binder et al. | 370/231 |
| 7,813,910 | B1 * | 10/2010 | Poulin | 703/22 |
| 7,889,663 | B1 * | 2/2011 | Wright et al. | 370/241 |
| 2002/0105921 | A1 * | 8/2002 | Sawyer et al. | 370/328 |
| 2003/0198242 | A1 * | 10/2003 | Zeidman | 370/428 |
| 2005/0004787 | A1 * | 1/2005 | Kubischta et al. | 703/19 |
| 2005/0055195 | A1 * | 3/2005 | Hernandez-Mondragon et al. | 703/23 |
| 2006/0072466 | A1 * | 4/2006 | Wang et al. | 370/241 |
| 2006/0209866 | A1 * | 9/2006 | Steenkiste et al. | 370/419 |
| 2006/0223522 | A1 * | 10/2006 | Guo et al. | 455/423 |
| 2006/0229020 | A1 * | 10/2006 | Mlinarsky et al. | 455/67.14 |
| 2006/0233111 | A1 * | 10/2006 | Wright | 370/241 |
| 2008/0311901 | A1 * | 12/2008 | Bizzarri et al. | 455/424 |
| 2009/0204725 | A1 * | 8/2009 | Liu et al. | 709/246 |
| 2009/0209250 | A1 * | 8/2009 | Huq | 455/425 |

OTHER PUBLICATIONS

Kojo et al. Seawind: a Wireless Network Emulator in Proceedings of 11th GI/ITG Conference on Measuring, Modelling and Evaluation of Computer and Communication Systems, Sep. 2001, Aachen, Germany.*

* cited by examiner

*Primary Examiner* — Hugh Jones
*Assistant Examiner* — Cuong Luu
(74) *Attorney, Agent, or Firm* — Kilpatrick Townsend & Stockton LLP (57) ABSTRACT

A method, apparatus and computer program product for emulating a mobile network for an emulated mobile device is presented. A mobile device is emulated with a mobile device emulator. Network data requested by the mobile device emulator is acquired and stored in a mobile network data buffer. The data requested by the mobile device emulator is provided from the mobile network data buffer in accordance with predetermined network conditions, the predetermined network conditions selected to emulate a mobile network that would be utilized by a mobile device being emulated.

20 Claims, 8 Drawing Sheets

```
Content-Length: 7507
Content-Type: image/jpeg
Age: 118567
X-Cache: HIT from photocache16.AAAAA.re2.yahoo.com
X-Cache-Lookup: HIT from photocache16.AAAAA.re2 AAAAA com:80
Via: 1.0 photocache16.AAAAA.re2 AAAAA.com:80 (squid/2.7.DEVEL0-20080320)
Connection: close
Network Traffic: Data In
Binary Data...
Connected to http://static.AAAAA.com/146/427665153_351590eec_s.jpg.
Loading data from http://static.AAAAA.com/146/427665153_351590eac_s.jpg.
Finished request for http://static.AAAAA.com/146/427665153_351590eac_s.jpg.

Network Traffic: Header Out
GET /201/457308253_b5b928255_s.jpg HTTP/1.1
Host: static.AAAAA.com
Accept: */*

Network Traffic: Header In
HTTP/1.0 200 OK
Date: Thu, 10 Apr 2008 08:00:36 GMT
Server: Apache/2.0.52 (Red Hat)
Cache-Control: max-age=31536000
Expires: Mon, 28 Jul 2014 23:30:00 GMT
Last-Modified: Fri, 13 Apr 2007 04:16:52 GMT
Accept-Ranges: bytes
Content-Length: 5736
Content-Type: image/jpeg
Age: 118591
X-Cache: HIT from photocache6.AAAAA.re2
X-Cache-Lookup: HIT from photocache6.AAAAA.re2:80
Via: 1.0 photocache6.AAAAA.re2 AAAAA.com:80 (squid/2.7.DEVEL0-20080320)
Connection: close
Network Traffic: Data In
Binary Data...
```

NETWORK SIMULATION FOR DOWNLOAD PROGRESS AND LATENCY

BACKGROUND

Mobile devices, such as cellular telephones (cell phones), Personal Digital Assistants (PDAs), and hand-held computers have become extremely popular. One reason for their popularity is the wide range of applications that are available for these devices. For example, a cell phone may include applications such as Internet access, music storage and playback, and Global Positioning System (GPS) based navigation.

As applications are continuously developed for mobile devices, it becomes important to determine how these applications will run and look on the mobile device. One method of determining how an application will run and look on the mobile device is to emulate the device and run the application on the emulated mobile device. Given the large number of mobile devices, it becomes important to emulate the application on various different mobile devices to determine optimal versions of the application.

SUMMARY

Conventional mechanisms such as those explained above suffer from a variety of deficiencies. One such deficiency is that conventional mobile device emulators do not include emulation for a mobile device network. If a mobile application requires data access via a network, the mobile device emulator typically uses the computer that is running the emulation to access the desired data across a network. Mobile network access is typically much slower than network access from a desktop computer, thus the network access being used by the mobile device emulator is not a realistic emulation of the network access that would be achieved by the mobile device operating in a real-world environment.

Embodiments of the invention significantly overcome such deficiencies and provide mechanisms and techniques that provide a network simulation for download progress and latency that more closely emulates a real-world environment for a mobile device being emulated.

In a particular embodiment of a method for providing mobile network emulation for an emulated mobile device, the method includes emulating a mobile device with a mobile device emulator. The method further includes acquiring network data requested by the mobile device emulator. This data requested by the mobile device emulator is acquired under network conditions which are different than a mobile device network the mobile device being emulated would encounter in a real-world environment. To account for this, the mobile device emulator includes a mobile network data buffer. The network data acquired as a result of the request by the mobile device emulator is stored in the mobile network data buffer. The method further includes the mobile device emulator providing the requested data from the mobile network data buffer to the display area of the mobile device being emulated at a predetermined speed and latency which has been selected by the user to emulate a mobile network that would be utilized by the mobile device being emulated. In such a manner, the mobile device emulator is able to provide an emulation that more closely reflects the real world environment the mobile device being emulated would encounter.

Other embodiments include a computer readable medium having computer readable code thereon for providing mobile network emulation for an emulated mobile device. The computer readable medium includes instructions for emulating a mobile device with a mobile device emulator. The computer readable medium further includes instructions for acquiring network data requested by the mobile device emulator. This data requested by the mobile device emulator is acquired under network conditions which are different than a mobile device network the mobile device being emulated would encounter in a real-world environment. To account for this, the mobile device emulator includes a mobile network data buffer. The network data acquired as a result of the request by the mobile device emulator is stored in the mobile network data buffer. The computer readable medium further includes instructions for providing the requested data from the mobile network data buffer to the display area of the mobile device being emulated at a predetermined speed and latency which has been selected by the user to emulate a mobile network that would be utilized by the mobile device being emulated. In such a manner, the mobile device emulator is able to provide an emulation that more closely reflects the real world environment the mobile device being emulated would encounter Still other embodiments include a computerized device, configured to process all the method operations disclosed herein as embodiments of the invention. In such embodiments, the computerized device includes a memory system, a processor, and a communications interface in an interconnection mechanism connecting these components. The memory system is encoded with a process that provides mobile network emulation for an emulated mobile device as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing mobile network emulation for an emulated mobile device as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems Incorporated of San Jose, Calif.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method, computer readable medium and apparatus for providing a mobile device emulator which includes emulation of mobile device network conditions are presented. A mobile device emulator which includes a mobile network data buffer is executed on a computer system, and is used to emulate how mobile content would look and run as it is executed by the actual mobile device. Part of the execution of the mobile content requires the mobile device emulator to access data via a network. The device emulator acquires the data from a network the computer system running the emulator is in communication with and stores the data in the mobile network data buffer. For example, if the mobile device network emulator were executing on a computer system having a T1 network connection, the data requested by the mobile device emulator would be acquired at the T1 data speed of 1.544 Megabytes per second (Mb/s) and stored in the mobile network data buffer. In a particular embodiment, the data buffer may be realized as a First-In-First Out (FIFO) buffer.

The mobile device emulator provides the requested data from the mobile network data buffer to the display of the device being emulated in accordance with pre-selected settings. For example, if the user has selected 24.7 Kilobytes per second (Kb/s) GSM as the mobile network to emulate, the requested data is provided by the mobile device emulator from the mobile network data buffer (emptying of the FIFO), at the 24.7 Kb/s rate, even though the data was acquired and stored in the network data buffer at the 1.544 Mb/s rate.

Figure 1:
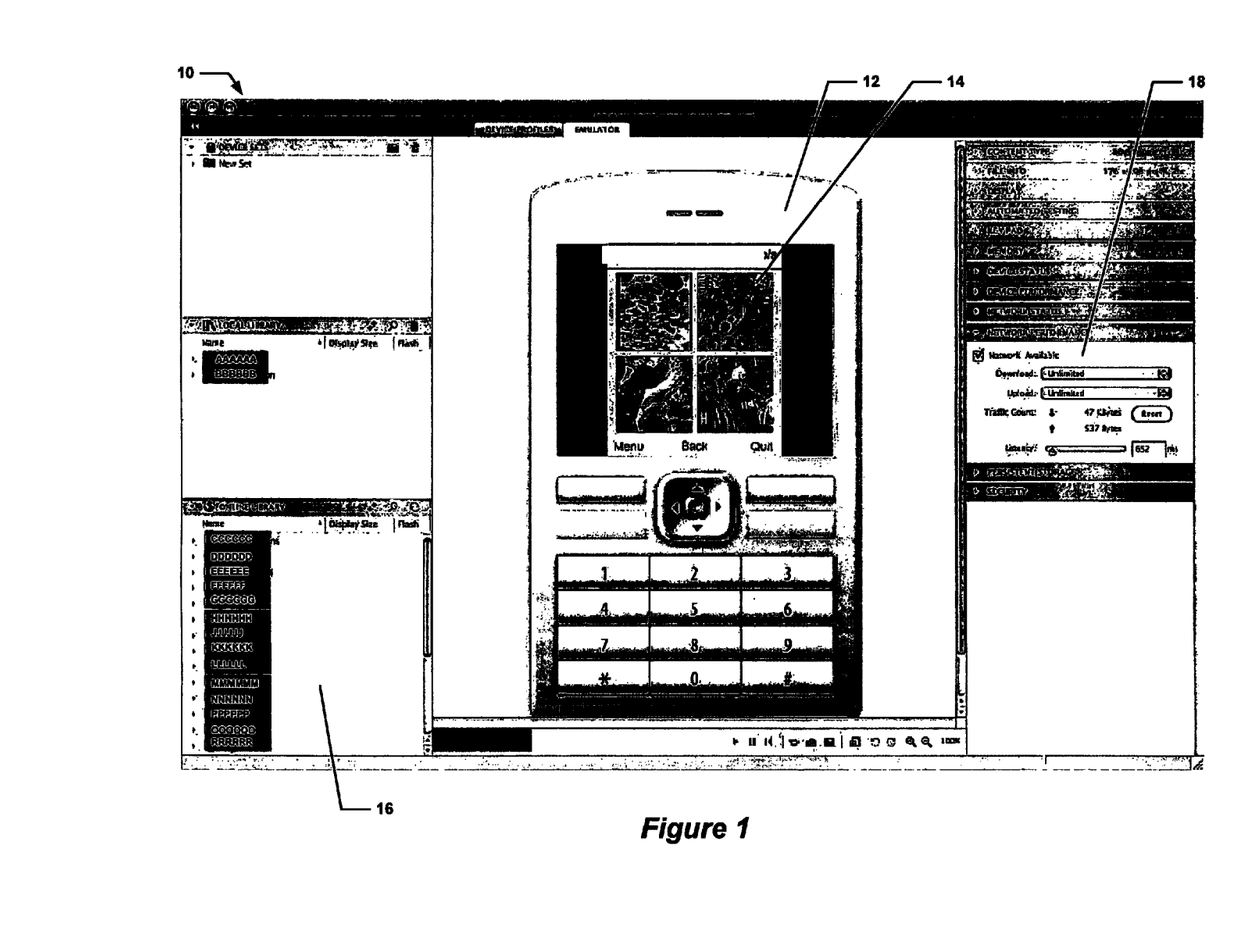
FIG. 1 is a screen shot of a computer system running a mobile device emulator in accordance with embodiments of the invention.

An example is shown in FIG. 1. Here a screen shot 10 of a mobile device emulator is presented. The screen shot 10 includes the mobile device emulator displaying an emulated device 12 having a display area 14. Also shown is device area 16 of the mobile device emulator which lists a library of different mobile devices which could be emulated. A network performance area 18 of the mobile device emulator allows for emulation of a mobile network in accordance with user-defined wireless network parameters is also shown.

The mobile device emulator in this example is being used to emulate a cellular telephone, though other mobile devices (e.g., a PDA or hand-held computer) could also be emulated. Further, while a particular cellular telephone is being emulated, it should be appreciated that other types and styles of cellular telephones, including those from different vendors, could be emulated. Area 16 of the screen shot shows a library of different mobile devices that could be emulated.

The mobile device emulator provides an emulated device including a display area 14. The application being emulated on the mobile device emulator in this example accesses a photo sharing web site to download a set of images from the web site to the mobile device emulator for display in display area 14.

The computer system executing the mobile device emulator acquires the data from a network the computer system is in communication with and stores the data in the mobile network data buffer. For example, if the mobile device network emulator were executing on a computer system having a T1 network connection, the data requested by the mobile device emulator would be acquired at the T1 data speed of 1.544 Megabytes per second (Mb/s) and stored in the mobile network data buffer.

The mobile device emulator provides the requested data from the mobile network data buffer to the display area 14 of the device 12 being emulated in accordance with pre-selected settings. For example, if the user has selected 24.7 Kilobytes per second (Kb/s) GSM as the mobile network to emulate, the requested data is provided by the mobile device emulator from the mobile network data buffer (emptying of the FIFO), at the 24.7 Kb/s rate, even though the data was acquired and stored in the network data buffer at the 1.544 Mb/s rate. In such a manner, an emulation that is more indicative of real world mobile environments is provided.

Figure 2:
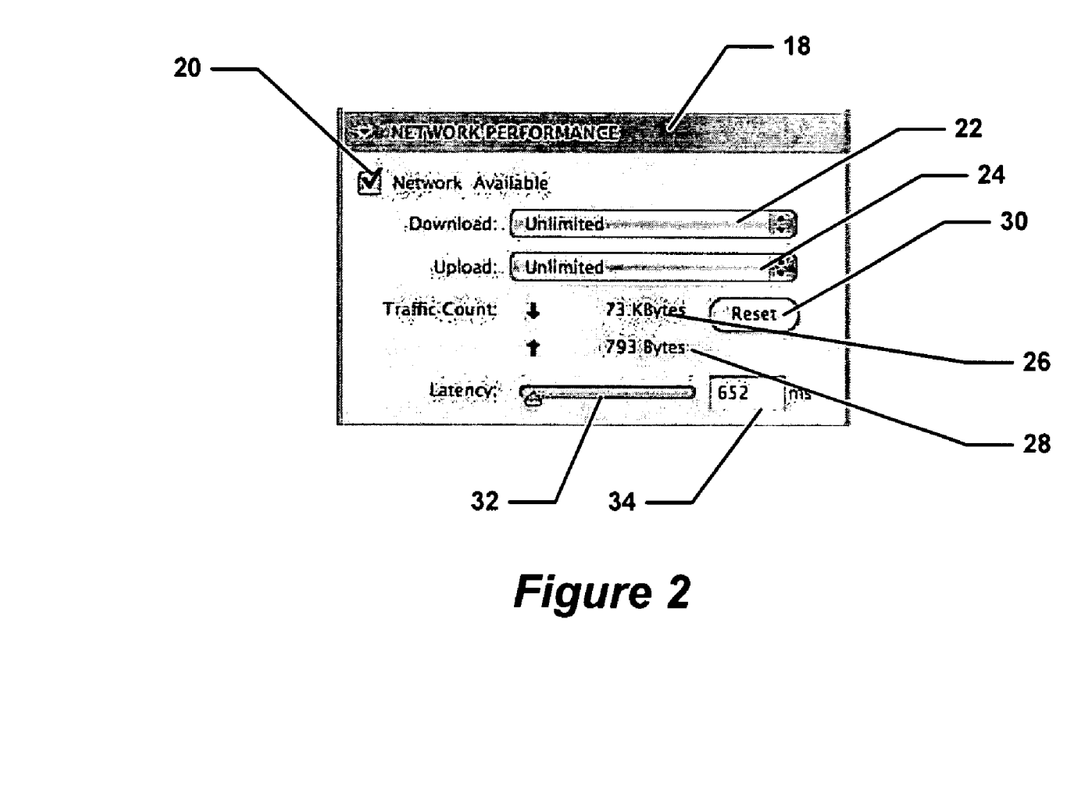
FIG. 2 is a screen shot showing a network performance menu of a mobile device emulator in accordance with embodiments of the invention.

Referring now to FIG. 2, the network performance area 18 of the mobile device emulator application is shown. While check boxes, drop-down menus and slide bars are shown and described, it should be understood that the functions provided within performance area 18 could be presented in a variety of ways as would be known to one of reasonable skill in the art.

The network performance area includes a check box 20 indicating whether a network is available. In this example, the box 20 has been checked, indicating that a network is available. The next section of the network performance area 18 includes a drop down menu 22 for selecting the download performance level to be used. The following section is also a drop-down menu 24 for selecting an upload performance level to be used. A traffic count for both outgoing traffic 26 and incoming traffic 28 is also shown, along with a reset button 30 for resetting the counts of incoming and outgoing traffic. Also shown is a slide bar for 32 selecting a desired latency to be associated with the emulated network. Box 34 indicates the selected latency, 652 milliseconds in this example.

Figure 3:
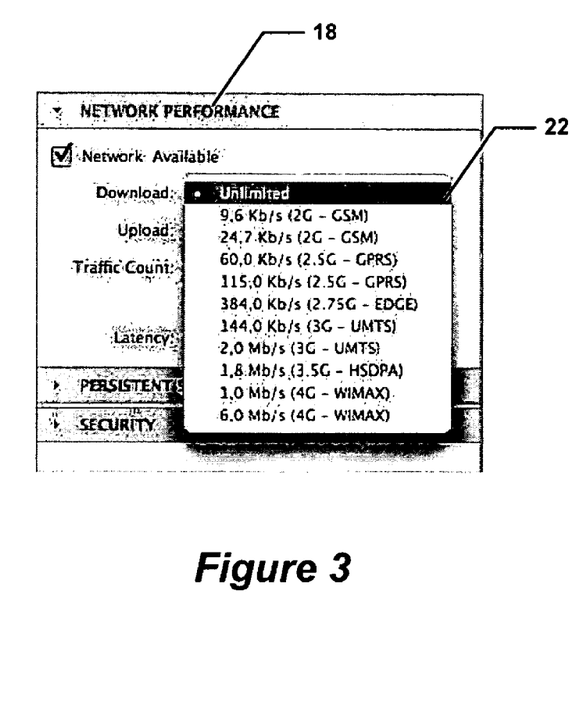
FIG. 3 is a screen shot showing available networks to emulate as part of a mobile device emulator.

Referring now to FIG. 3, the user has selected the download performance menu bar 22. The highlighted entry indicates the current setting. In this example "Unlimited" has been selected. Also available for the user are various other settings for the emulated network download performance. These settings are used in providing network traffic emulating the mobile network to provide an accurate representation of the performance of the application on the emulated device in a real world environment.

By way of network performance area 18, the user is able to select from a variety of different mobile network environments and speeds to provide an emulated mobile network for the emulated device. In this example, the user is able to select from 9.6 Kb/s (thousand bits per second) Global System for Mobile (GSM), 24.7 Kb/s GSM, 60.0 Kb/s General Packet Radio Service (GPRS), 115.0 Kb/s GPRS, 384.0 kb/s Enhanced Data rates for GSM Evolution (EDGE), 144.0 Kb/s Universal Mobile Telecommunications System (UMTS), 2.0 Megabyte per second (Mb/s) UMTS, 1.8 Mb/s High-Speed Downlink Packet Access (HSDPA), 1.0 Mb/s Worldwide Interoperability for Microwave Access (WIMAX), and 6.0 Mb/s WIMAX.

Figure 4:
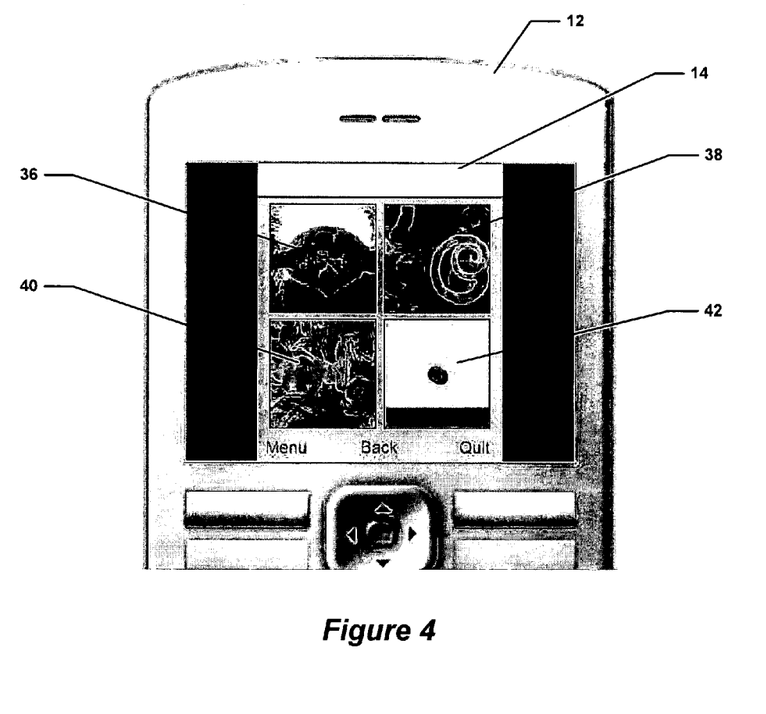
FIG. 4 is a screen shot showing an application being executed using emulated network conditions in accordance with embodiments of the invention.

Referring now to FIG. 4, the mobile device emulator is in the process of displaying data which has been buffered by the mobile network data network data buffer and is being provided in accordance with the network performance settings selected by the user. Here, the application being evaluated is downloading a series of four images from a photo sharing web site. The first three of the images 36, 38 and 40 have been successfully downloaded, while the fourth image is in the process of downloading. While waiting for the fourth image to download a busy indicator 42 of two rotating dots is shown, providing the user an indication that the emulated device is working and has not timed out or otherwise lost the network connection. The mobile device emulator is thus able to provide to the user an accurate idea of how the mobile application will look and run on the mobile device, and the user can test the application on various devices and at a variety of settings in order to determine optimal version(s) of the application. The mobile device emulator allows the user to try various speeds and configurations for the same device being emulated, as well as allowing the mobile device network configuration to be used with a variety of different mobile devices.

Figure 5:
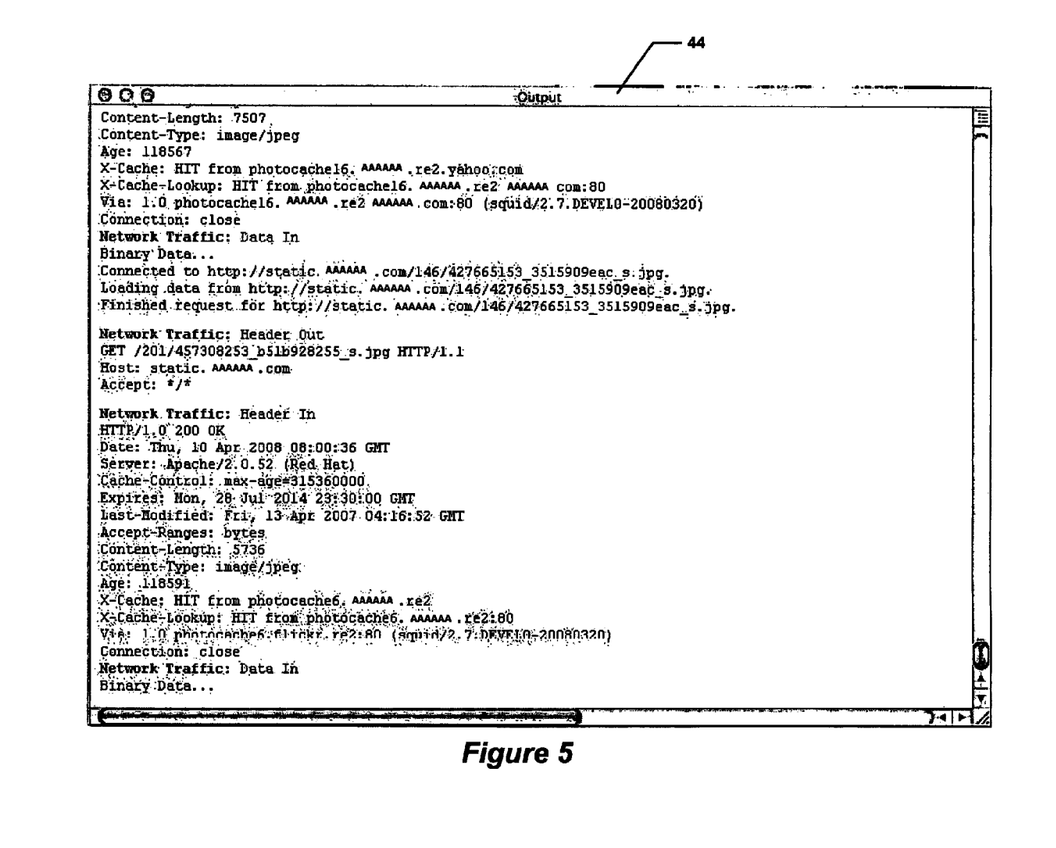
FIG. 5 is a screen shot showing a network log in accordance with embodiments of the invention.

The mobile device emulator may also maintain a network log. An example of a network log 44 is shown in FIG. 5. In this embodiment, the network log 44 shows the network traffic generated by the request or request of the emulated content. The data being transmitted and received is shown, with the exception of binary data, since the binary data is not human readable.

Figure 6:
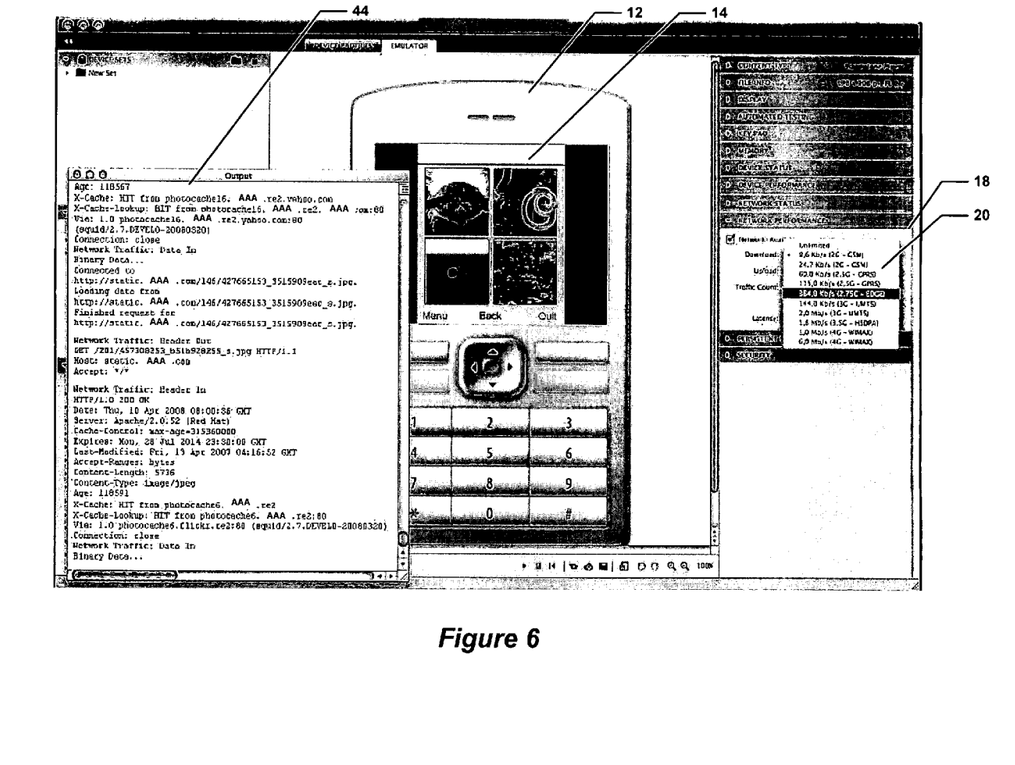
FIG. 6 is a screen shot showing a mobile device emulator with a network performance menu and network log displayed in accordance with embodiments of the invention.

Referring now to FIG. 6, a screen shot 46 of the mobile device emulator is shown. In this screen shot 46 the mobile device emulator is shown having downloaded a series of images from a photo sharing website. The network performance has been selected (in this example the 384 kb/s EDGE mobile network). Also shown is the associated network log 44, showing details of the data as it is received by the emulated device 12.

Figure 7:
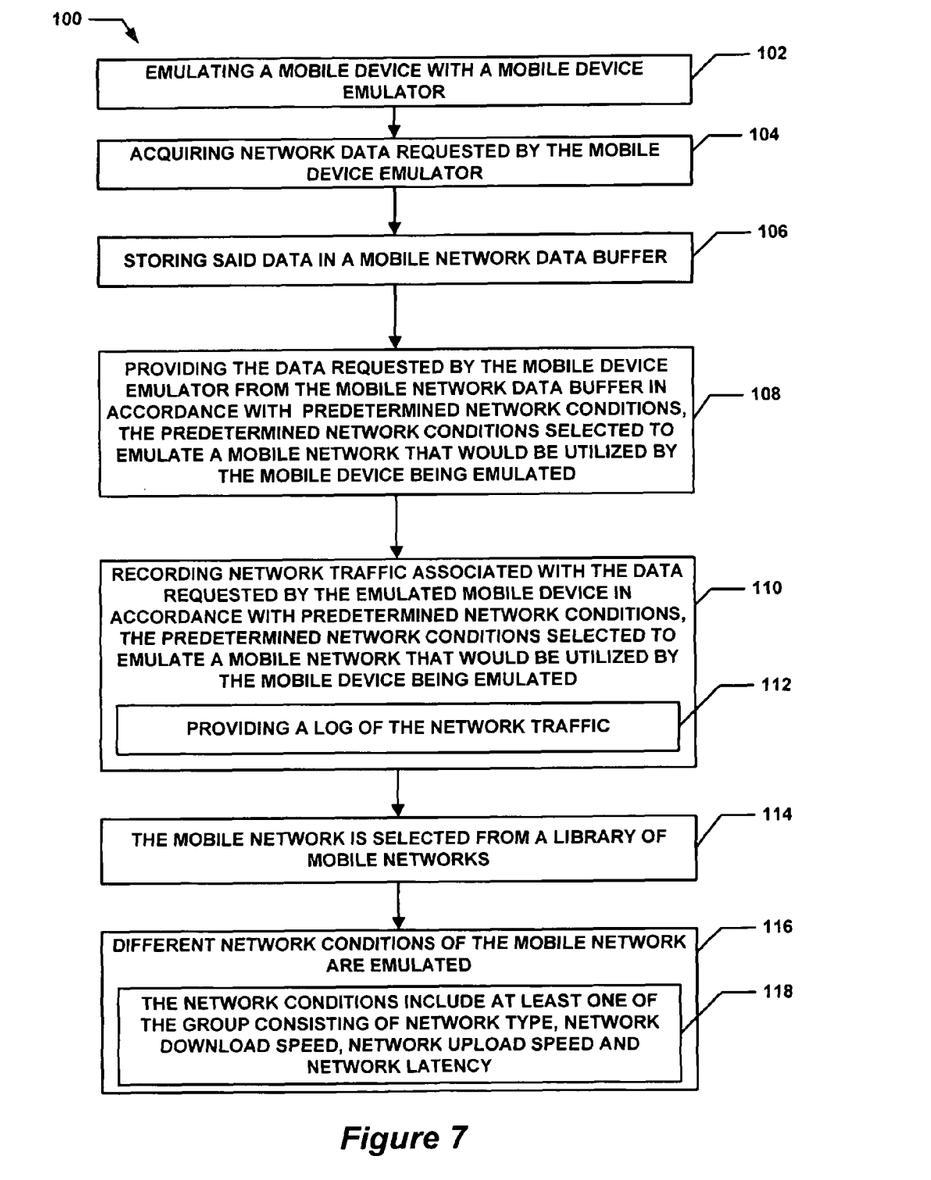
FIG. 7 is a flow diagram of a particular embodiment of a method for providing mobile network emulation for an emulated mobile device in accordance with embodiments of the invention.

A flow chart of a particular embodiment of the presently disclosed method is depicted in FIG. 7. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 7, a flow diagram of a particular embodiment of a method 100 is shown. Method 100 begins with processing block 102 which discloses emulating a mobile device with a mobile device emulator. The mobile device emulator may emulate a cellular telephone, Personal Digital Assistant or and hand-held computer. The mobile device being emulated may be selected from a library of mobile devices provided as part of the mobile device emulator. The mobile device emulator will approximate how pages and graphics will look on a variety of mobile devices with different screen resolutions, color depths, memory constraints, and other performance characteristics. The mobile device emulator may provide the user with additional functions such as rescaling graphics, simulating a mobile phone's backlight dimming, adding artificial screen reflections and changing the color balance.

Processing block 104 states acquiring network data requested by the mobile device emulator. Thus, data requested by the mobile device emulator is acquired in accordance with the network conditions of the network the computer system is in communication with.

Processing block 106 recites storing said data in a mobile network data buffer. The mobile device emulator acquires the data from a network the computer system is in communication with and stores the data in the mobile network data buffer. For example, if the mobile device network emulator were executing on a computer system having a T1 network connection, the data requested by the mobile device emulator would be acquired at the T1 data speed of 1.544 Megabytes per second (Mb/s) and stored in the mobile network data buffer. In a particular embodiment, the mobile network data buffer may be realized as a First-In-First Out (FIFO) buffer.

Processing block 108 discloses providing the data requested by the mobile device emulator from the mobile network data buffer in accordance with predetermined network conditions, the predetermined network conditions selected to emulate a mobile network that would be utilized by a mobile device being emulated. The mobile device emulator provides the requested data from the mobile network data buffer to the display area of the device being emulated in accordance with pre-selected settings. For example, if the user has selected 24.7 Kilobytes per second (Kb/s) GSM as the mobile network to emulate, the requested data is provided by the mobile device emulator from the mobile network data buffer (emptying of the FIFO), at the 24.7 Kb/s rate, even though the data was acquired and stored in the network data buffer at the 1.544 Mb/s rate. In such a manner, an emulation that is more indicative of real world mobile environments is provided.

Processing continues with processing block 110 which recites recording network traffic data associated with the data requested by the mobile device emulator in accordance with predetermined network conditions, the predetermined network conditions selected to emulate a mobile network that would be utilized by the mobile device being emulated. This can also include providing a log of the network traffic, as shown in processing block 112. The log file can be examined by the user to determine various conditions and data the network experienced.

Processing block 114 discloses wherein the mobile network is selected from a library of mobile networks. The user can therefore emulate the device in accordance with different network types or different speeds.

Processing block 116 states wherein different network conditions of the mobile network are emulated. As shown in processing block 118 the network conditions include at least one of the group consisting of network type, network download speed, network upload speed and network latency.

Figure 8:
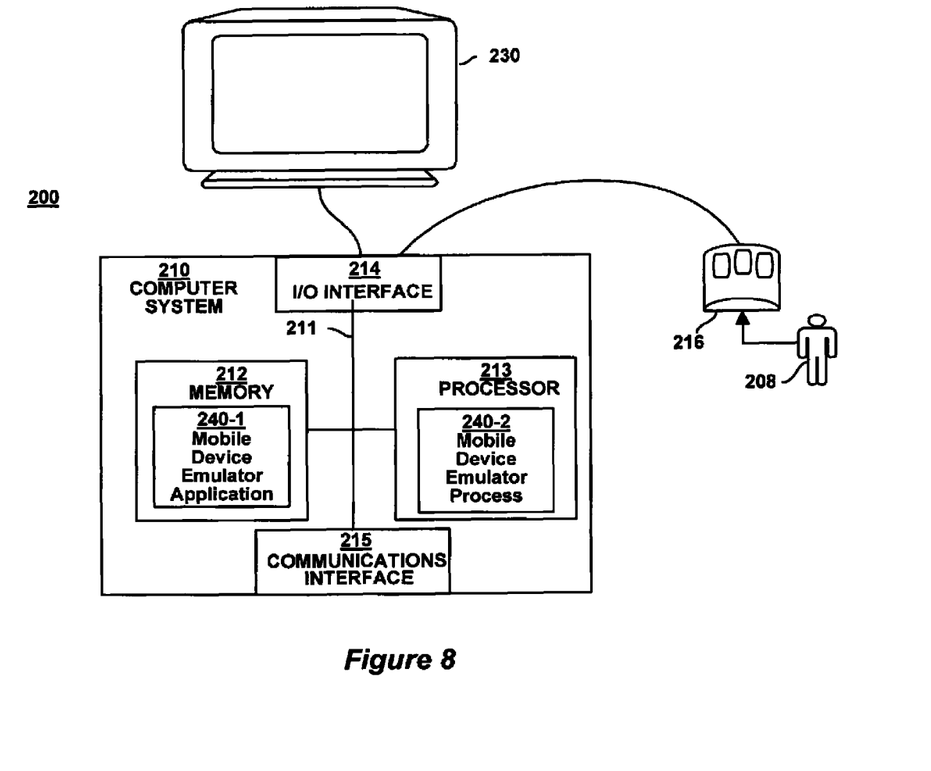
FIG. 8 illustrates an example computer system architecture for a computer system executing a device emulator with emulated network conditions in accordance with embodiments of the invention.

FIG. 8 is a block diagram illustrating an example system 200 for implementing emulated network function 240 and/or other related processes to carry out the different functionality as described herein.

As shown, system 200 of the present example includes an interconnect 211 that couples a memory system 212 and a processor 213 an input/output interface 214, and a communications interface 215.

As shown, memory system 212 is encoded with mobile device emulator application 240-1. Mobile device emulator application 240-1 can be embodied as software code such as data and/or logic instructions (e.g., code stored in the memory or on another computer readable medium such as a disk) that support functionality according to different embodiments described herein. User 208 is able to access mobile device emulator application 240-1 and utilizes an input device 216 (e.g., mouse, keyboard, track ball, touchpad or the like) to navigate a graphical user interface (GUI) of the mobile device emulator on display 230. The user can select various settings of the mobile device emulator application 240-1 to execute emulation of the mobile device.

During operation, processor 213 of system 200 accesses memory system 212 via the interconnect 211 in order to launch, run, execute, interpret or otherwise perform the logic instructions of the mobile device emulator application 240-1. Execution of mobile device emulator application 240-1 produces processing functionality in mobile device emulator process 240-2. In other words, the mobile device emulator process 240-2 represents one or more portions of the mobile device emulator application 240-1 (or the entire application) performing within or upon the processor 213 in the computer system 200.

It should be noted that, in addition to the mobile device emulator process 240-2, embodiments herein include the mobile device emulator application 240-1 itself (i.e., the unexecuted or non-performing logic instructions and/or data). The mobile device emulator application 240-1 can be stored on a computer readable medium such as a floppy disk, hard disk, or optical medium. The mobile device emulator application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of mobile device emulator application 240-1 in processor 213 as the mobile device emulator process 240-2. Those skilled in the art will understand that the system 200 can include other processes and/or software and hardware components, such as an operating system that controls allocation and use of hardware resources associated with the computer system 200.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A non-transitory computer readable medium having computer readable code thereon, the medium comprising:
    code executable by a processor for emulating a mobile device by a mobile device emulation application executed at a computing system;
    code executable by a processor for acquiring network data requested by the mobile device emulation application from a network the computing system is in communication with;
    code executable by a processor for storing, by said mobile device emulation application, said data in a mobile network data buffer; and
    code executable by a processor for providing, at the mobile device being emulated, said data requested by said mobile device emulation application from said mobile network data buffer in accordance with predetermined network conditions, said predetermined network conditions emulating, by said mobile device emulation application, a mobile network that would be utilized by the mobile device being emulated, wherein the mobile network being emulated and the mobile device being emulated are both emulated on the same computer.

2. The non-transitory computer readable medium of claim 1 further comprising code executable by a processor for recording, by said mobile device emulation application, network traffic data associated with said data requested by mobile device emulation application in accordance with said predetermined network conditions, said predetermined network conditions selected to emulate, by said mobile device emulation application, the mobile network that would be utilized by the mobile device being emulated.

3. The non-transitory computer readable medium of claim 2 further comprising code executable by a processor for providing, by the mobile device emulation application, a log of said network traffic.

4. The non-transitory computer readable medium of claim 1 further comprising code executable by a processor wherein said mobile network is selected from a library of mobile networks provided by the mobile device emulation application.

5. The non-transitory computer readable medium of claim 1 further comprising code executable by a processor wherein different network conditions of said mobile network are emulated by the mobile device emulation application.

6. The non-transitory computer readable medium of claim 5 further comprising code executable by a processor wherein said network conditions include at least one of the group consisting of network type, network download speed, network upload speed and network latency.

7. The non-transitory computer readable medium of claim 1 wherein said mobile device is selected from a library of mobile devices by the mobile device emulation application.

8. A method comprising:
    emulating a mobile device by a mobile device emulation application executed at a computing system;
    acquiring network data requested by said mobile device emulation application from a network the computing system is in communication with;
    storing, by said mobile device emulation application, said data in a mobile network data buffer; and
    providing, at the mobile device being emulated, said data requested by said mobile device emulation application from said mobile network data buffer in accordance with predetermined network conditions, said predetermined network conditions emulating, by said mobile device emulation application, a mobile network that would be utilized by the mobile device being emulated, wherein the mobile network being emulated and the mobile device being emulated are both emulated on the same computer.

9. The method of claim 8 further comprising recording, by said mobile device emulation application, network traffic data associated with said data requested by said mobile device emulation application in accordance with said predetermined network conditions, said predetermined network conditions selected to emulate, by said mobile device emulation application, the mobile network that would be utilized by the mobile device being emulated.

10. The method of claim 9 further comprising providing, by said mobile device emulation application, a log of said network traffic.

11. The method of claim 8 wherein said mobile network is selected from a library of mobile networks provided by said mobile device emulation application.

12. The method of claim 8 wherein different network conditions of said mobile network are emulated by said mobile device emulation application.

13. The method of claim 12 wherein said network conditions include at least one of the group consisting of network type, network download speed, network upload speed and network latency.

14. The method of claim 8 wherein said mobile device is selected from a library of mobile devices provided by said mobile device emulation application.

15. A computer system comprising:
    a memory;
    a processor; and
    wherein the memory is encoded with a mobile device emulation application that when performed on the processor, provides a process causing the system to perform the operations of:
    emulating, by said mobile device emulation application executed at said computing system, a mobile device;

acquiring, by said computer system, network data requested by said mobile device emulation application from a network the computing system is in communication with;

storing, by said mobile device emulation application, said data in a mobile network data buffer; and providing, at said mobile device being emulated, said data requested by said mobile device emulation application from said mobile network data buffer in accordance with predetermined network conditions, said predetermined network conditions emulating, by said mobile device emulation application, a mobile network that would be utilized by said mobile device being emulated, wherein the mobile network being emulated and the mobile device being emulated are both emulated on the same computer.

16. The computer system of claim 15 further comprising recording, by said mobile device emulation application, network traffic data associated with said data requested by said mobile device being emulated in accordance with said predetermined network conditions, said predetermined network conditions selected to emulate, by said mobile device emulation application, the mobile network that would be utilized by said mobile device being emulated.

17. The computer system of claim 16 further comprising providing, by said mobile device emulation application, a log of said network traffic.

18. The computer system of claim 15 wherein said mobile network is selected from a library of mobile networks selected from a library of mobile networks provided by the mobile device emulation application.

19. The computer system of claim 15 wherein different network conditions of said mobile network are emulated by the mobile device emulation application.

20. The computer system of claim 19 wherein said network conditions include at least one of the group consisting of network type, network download speed, network upload speed and network latency.

* * * * *